March 17, 1931.  I. L. READ ET AL  1,797,020
TREE AND TREEING MACHINE OR APPLIANCE FOR BOOTS AND SHOES
Filed April 24, 1930    4 Sheets-Sheet 2

INVENTORS

March 17, 1931. I. L. READ ET AL 1,797,020
TREE AND TREEING MACHINE OR APPLIANCE FOR BOOTS AND SHOES
Filed April 24, 1930 4 Sheets-Sheet 3

INVENTORS

Patented Mar. 17, 1931

1,797,020

UNITED STATES PATENT OFFICE

ISAAC LEONARD READ AND FRANK COLEMAN CHOICE, OF LEICESTER, ENGLAND, ASSIGNORS TO UNITED SHOE MACHINERY CORPORATION, OF PATERSON, NEW JERSEY, A CORPORATION OF NEW JERSEY

TREE AND TREEING MACHINE OR APPLIANCE FOR BOOTS AND SHOES

Application filed April 24, 1930, Serial No. 447,017, and in Great Britain March 20, 1929.

This invention relates to trees and treeing machines or appliances for carrying out ironing and similar finishing operations on boots and shoes and is herein illustrated as embodied in a treeing machine of the type employing inflatable trees.

One object of the invention is to provide an inflatable tree of a more simple, less expensive, and more handy construction than those employed heretofore, as will be hereinafter described.

Sometimes operators remove boots and shoes from treeing machines or appliances after ironing and like operations, for removing traces of wax, polish, stains and the like, but it is desirable that the trees should remain in the work at this time, otherwise there is a risk of the work losing its shape, especially in the case of light grade shoes. If, however, the trees are of a cumbersome or weighty character, this prevents the work from being readily and easily handled and consequently the operator is liable to take the work off the tree with the result that the work lacks the support necessary to preserve its shape.

Accordingly, another object of the invention is to provide an inflatable tree of a light construction adapted for ready connection to and disconnection from the machine or appliance, without deflation, so as to enable the work to be removed and easily handled as and for the purpose aforesaid, without losing the support of the inflated tree.

The invention also has for its object to provide an improved support for a tree of this type, the improvements in this connection being mainly concerned with the connection and disconnection of the tree to and from the support, and the inflation and deflation of the tree when this is on the support.

Still another object of the invention is the provision of an improved tree support for a treeing machine or appliance whereby the tree can be moved, as well as rotated as usual, for bringing the work into favourable positions to facilitate operation thereon, as will be more fully described later herein. This improvement is, of course, applicable to treeing machines or appliances generally, that is to say, it is not to be regarded as limited to use in conjunction with the other improvements previously referred to.

It is however mainly intended to incorporate the various improvements in one and the same support for use in conjunction with the tree forming part of this invention.

With the aforesaid objects in view we provide, in the illustrated embodiment of the invention, an inflatable tree in the shape of a foot and furnished with means enabling it to be readily connected to and disconnected from a support, and with means for establishing connection with the source of air or fluid supply for inflating the tree.

The improved tree may be inflatable wholly, or in part, that is to say, the tree may have an inflatable forepart and a rigid heel part, or alternatively, both the forepart and the heel part may be inflatable, a valve device being, of course, provided on the foot for controlling the admission and discharge of the inflating medium. The inflatable portions of the foot are made of rubber, leather or some other suitable pliable material.

Preferably, and as illustrated, the foot is substantially wholly inflatable and may be formed with communicating forepart and heel sections, or may comprise separate sections, associated with a common member through which the air or other fluid is supplied to and discharged from the foot. The complete foot may be enclosed in a casing or envelope of rubber, leather, canvas or the like, or some other suitable pliable material.

For connecting the tree to the support therefor, in a simple manner, the former may be furnished with a projecting attaching member in the form of a disc, tapered plug or like member for insertion into a corresponding socket on the support, whereby a substantially air-tight joint is formed between the two.

An important feature of the invention resides in a novel construction and arrangement whereby the connection between the tree and the means for inflating the same may be established simultaneously with the application of the tree to the support.

The invention is to be regarded not only as covering the various improvements hereinbefore described in combination, but also as covering same separately. That is to say, the invention covers as one of its features an inflatable tree characterized in that it is simply in the shape of a foot which can be readily applied to and removed from its support in the treeing machine or appliance, as well as inflated on and deflated either on or off the support. One advantage of this improvement is that the tree can be removed bodily from the support and readily handled for the purpose previously alluded to herein, since the tree does not extend from the work to any appreciable extent, and is very little weightier than the work so that the operator has really nothing more cumbersome to handle than the work itself, while the shape of the work is preserved. The tree is mainly intended for use in connection with light grade ladies' shoes, but is not limited in this respect.

Another feature of the invention is a tree support having inflating means operable as the result of relative movement between itself and the tree, said support being mainly intended for use in conjunction with the improved tree, while the remaining feature resides in a support which is adjustable to different positions as and for the purpose hereinbefore set forth, the advantages of which are obvious.

For this purpose the illustrated connecting means on the tree also serve as, or are connected with, the aforesaid valve device, and the support has means including a valve or equivalent for controlling the supply of air or other fluid to the tree, the said device and means being brought into co-operative relation upon application of the tree to the support. For example, when the tree is furnished with a disc, tapered plug or the like, for insertion into a corresponding socket, recess or equivalent, as aforesaid, the plug or the like may be bored and connected with the aforesaid valve device, and the socket, recess or equivalent may be associated with or form part of the controlling means in the support. The plug and socket or like connection provides a tight joint and, if necessary, means may be provided on the support for slackening the joint to facilitate removal of the tree as and when required, as will be hereinafter described in detail. When the tree is furnished with a disc as aforesaid this may be rotatable in the socket or recess, or the latter may be formed in a part rotatably mounted in the support, to permit of the tree being revolved on the support to put the work into the most favourable positions for performing the requisite operations.

The controlling means in the support as illustrated are in turn connected with an air or fluid supply for which purpose a suitable inlet is provided in the support, and the latter may be, and preferably is, furnished with an outlet, with or without a valve, for use in conjunction with the controlling device on the tree so that the latter can be deflated as and when required, without removing it from the support.

Another feature of this part of the invention is that the controlling device on the tree, and the controlling means in the support, may be constructed and arranged for operation as the result of relative movement between the tree and the support, when the former is applied to the latter, for both inflating and deflating the tree. Conveniently for this purpose, and as illustrated a yieldable connection is provided between the tree and the support, such connection being movable inwards in the support to open the respective controlling valves or equivalent elements. For example, the socketed or recessed part of the support may be slidably arranged and controlled by a spring in the support, and the controlling valves or the like may be slidable, spring controlled, and arranged so as to be brought into alignment by turning the tree to a definite position when it is applied to the support, whereupon by pressing the tree towards the support against the action of the aforesaid spring, one valve or equivalent can be caused to act upon the other so that both are eventually opened to inflate the tree. For this purpose the valve or equivalent in the tree may be located eccentrically with respect to the disc, plug or the like on the tree. For deflating the tree the support may be furnished with a pin or like abutment opposite to which the valve in the tree is brought by turning the tree to another position and then moving same towards the support so that the abutment opens the valve. Alternatively the valve in the tree may be concentric with the disc, plug or equivalent, so as to be brought into alignment with the valve or equivalent in the support straightway upon application of the tree to the support. In this arrangement, by proper proportioning of the strength of associated springs, both valves are opened to inflate the tree or only the valve in the tree is opened to deflate the latter, according to the movement imparted to the tree.

The improved support herein illustrated conveniently comprises an arm associated with a suitable stand or bracket, e. g., for use on a bench, or constituting part of the frame of a treeing machine or appliance, the said arm being provided with the means, e. g., the socket, recess or socketed part, corresponding with the means, e. g., the disc, tapered plug or equivalent on the tree, for completing the desired connection, and with the means for controlling the supply of air or other fluid to the tree.

We will now describe by way of example and with reference to the accompanying drawings, trees and supports therefor constructed in accordance with the invention.

According to the example illustrated in Figures 1 to 7 the tree comprises a foot portion 1 of rubber or other suitable pliable material having a rigid cone portion 2 to which is attached by screws 3 a plate 4 provided with a central hole 5 to receive a nipple 5a. The whole of the tree together with the plate 4 is enclosed in a pliable casing or covering 6, said casing being provided with a hole 7 to register with the hole 5 in the plate 4. Another plate 8 is attached to the plates 4 and 2, over the covering 6, by screws 9 and 9a. The plate 8 has a central boss 10 to which is attached by screws 11 (Fig. 2) a supporting projection or disc 12.

Figures 1, 2:
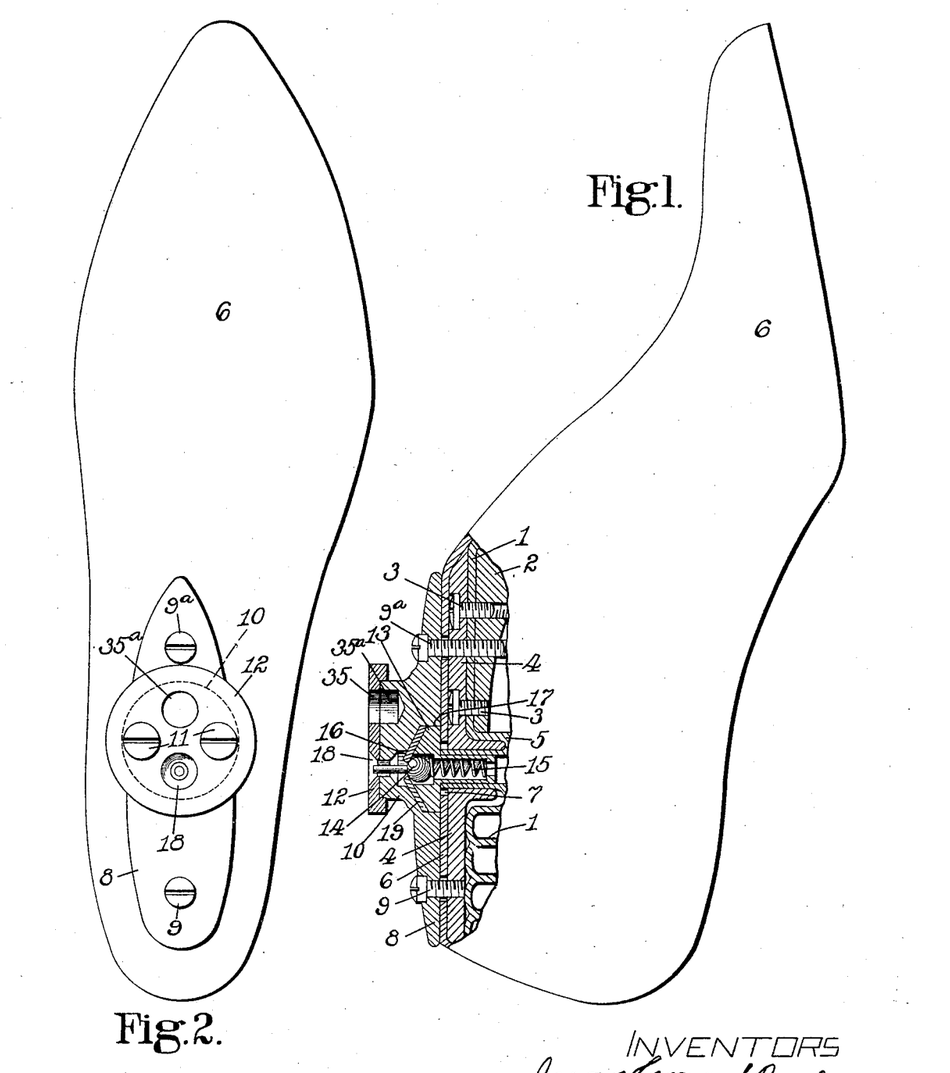
Figure 1 is a part sectional elevation of one form of tree, per se.
Figure 2 is a plan view of said tree.

Inserted in the nipple 5a is a bush or sleeve 13 which houses in the bore thereof a plunger or poppet valve 14 and a compression spring 15.

Eccentrically positioned in the boss 10 is a hole 16 having a counterbore 17. The disc 12 also has a hole 18 placed eccentrically therein which registers with the hole 16. Normally the valve 14 is held by the spring 15 against a rubber, leather or like seating 19 in the counterbore 17 which is also entered by the head of the bush or sleeve 13, and the valve stem extends through the holes 16 and 18.

The support for the aforesaid tree comprises a rigid arm 20 (Fig. 4) having a longitudinal bore 20a, housing a slidable sleeve 21, to the outer end of which is attached a collar 22 having at its outer end a U-shaped machined surface 22a (Figs. 3 and 7) which is slightly beyond said outer end and, together with a slightly larger U-shaped plate 23 attached thereto by screws 24, forms a socket or recess 25 (Fig. 3) to receive the aforesaid disc 12 on the tree. The sleeve 21 is controlled by a compression spring 21a (Fig. 4) located within a bore 21b in the sleeve and acting between the end of said bore and a ring or plate 26 let into the adjacent end of the arm and constituting a seating for a valve 27. At the same end the arm has attached thereto a cap 20b having a central passage 28 which communicates with, but is smaller than, the aforesaid bore 20a, and houses the valve 27 and a compression spring 27a by which the head of the valve is normally pressed against a packing 26a in the seating 26 as shown in Figure 4. The valve 27 controls the supply of air or other fluid through the arm for inflating the tree. A packing 26b is interposed between the arm 20 and the cap 20b. Extending through the sleeve 21 and spring 21a is a push rod 29 which at one end axially opposes the valve 27 and at the other end is furnished with lateral grooves forming air passages 29a (Figs. 4 and 5) and projects from the sleeve 21 into a hole in a washer 29b in the collar 22. The passage 28 in the cap 20b is tapped at the outer end to receive an air inlet nipple 30 to which may be applied a hose 30a connecting with the source from which the inflating medium is supplied.

Figure 6:
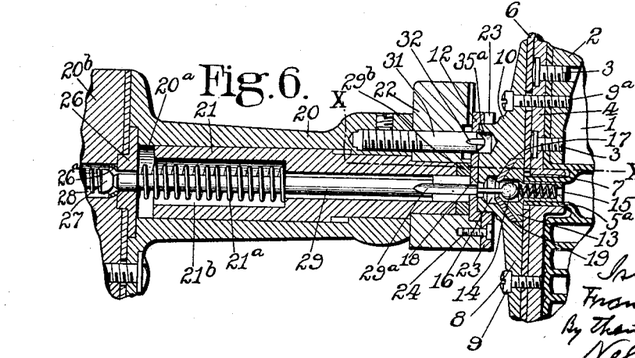
Figure 6 is a sectional detail taken axially of the supporting arm and showing how the tree is inflated.

It should be understood that the disc 12 can revolve in the socket or recess 25, the axis of rotation being indicated by the line x—x in Figures 4, 6 and 7. Thus when the tree is applied to the support, i. e. by inserting the disc 12 into the socket or recess 25, and the tree is turned to bring the toe end uppermost, the valve 14 in the tree is brought into alignment with the push rod 29 with but a short space in between as shown in Figure 4. It may be mentioned at this stage that the spring 15 which controls the valve 14 is weaker than that controlling the air supply valve 27. By exerting pressure on the tree in the direction of the support, compressing the spring 21a, the sleeve 21 is moved inwards in the arm 20 toward the position illustrated in Fig. 6, so that the opposing ends of the valve 14 and rod 29 make contact and the valve 14 is opened. At this stage the rod 29 engages the disc 12, whereupon as the result of continued movement of the tree said rod is also moved endwise and thus pushes the valve 27 off its seating, as shown in Figure 6, so that the inflating medium is admitted to the arm and passing by way of the sleeve 21, the passages 29a in the rod and the valve 14, inflates the tree. The inward movement of the sleeve is effected against the action of the controlling spring 21a so that, when the pressure on the sleeve is relieved, the spring operates to return same to the normal position and allow the valves 14 and 27 to close to stop the inflating action. The aforesaid movement of the tree is limited by the engagement of the collar 22 with the arm 20. The arm 20 has fixed longitudinally therein a pin or stud 31 which extends through a hole in the collar 22 and has lateral grooves forming air passages 32 at the outer end.

Figure 3:
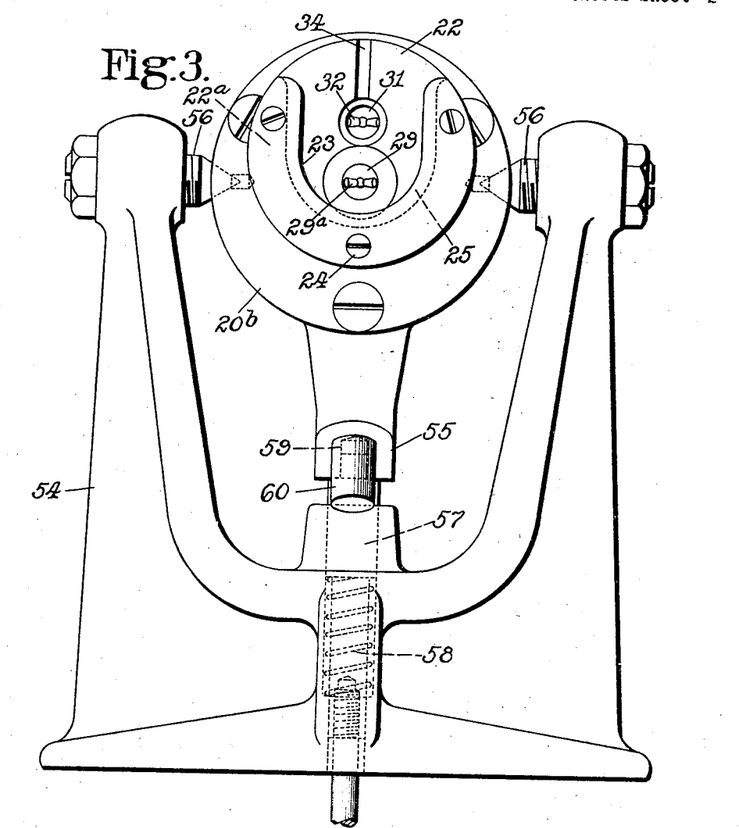
Figure 3 is an end view of a support for the tree shown in Figures 1 and 2.
Figures 4, 5, 7:
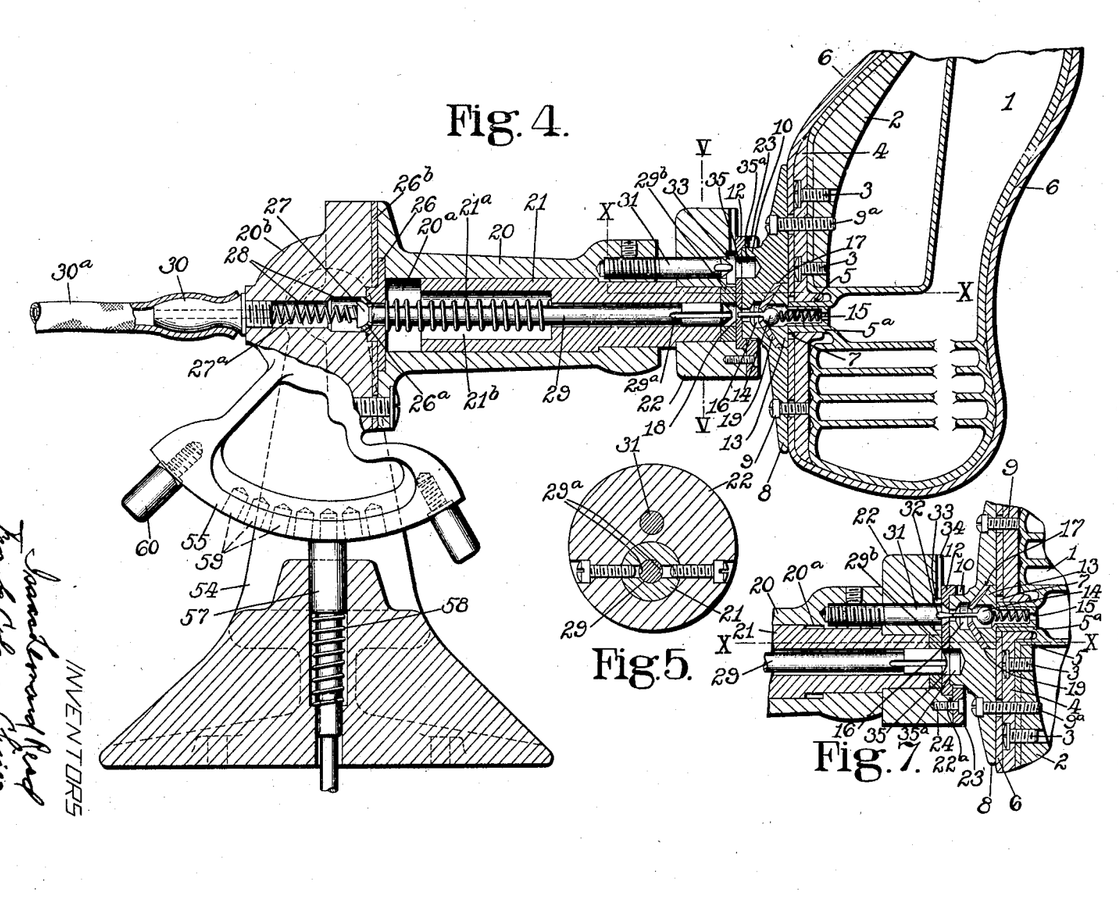
Figure 4 is a sectional side elevation of the tree and the support combined.
Figure 5 is a cross sectional view of the support taken on line V—V of Figure 4.
Figure 7 is a view similar to Figure 6 but shows the tree in position for deflating.

When it is desired to deflate the tree while on the support, the tree is turned to bring the toe end downwards so that, as shown in Figure 7, the valve 14 is brought into alignment with the stud 31, whereby upon pushing the tree inwards as before the opposing ends of the valve 14 and stud 31 are brought into contact, whereupon the valve is opened and the inflating medium escapes by way of the passages 32, a counterbore 33 round the stud 31, and a passage 34, Figures 3 and 7, in the adjacent end of the collar 22.

The disc 12 and boss 10 are provided with holes 35, 35a which are entered by the stud 31 as shown in Figure 6, when the tree is moved in the direction of the support for inflation, the hole 35 in the disc 12 being entered by the rod 29 as shown in Figure 7 when the tree is to be deflated as aforesaid.

Figure 8:
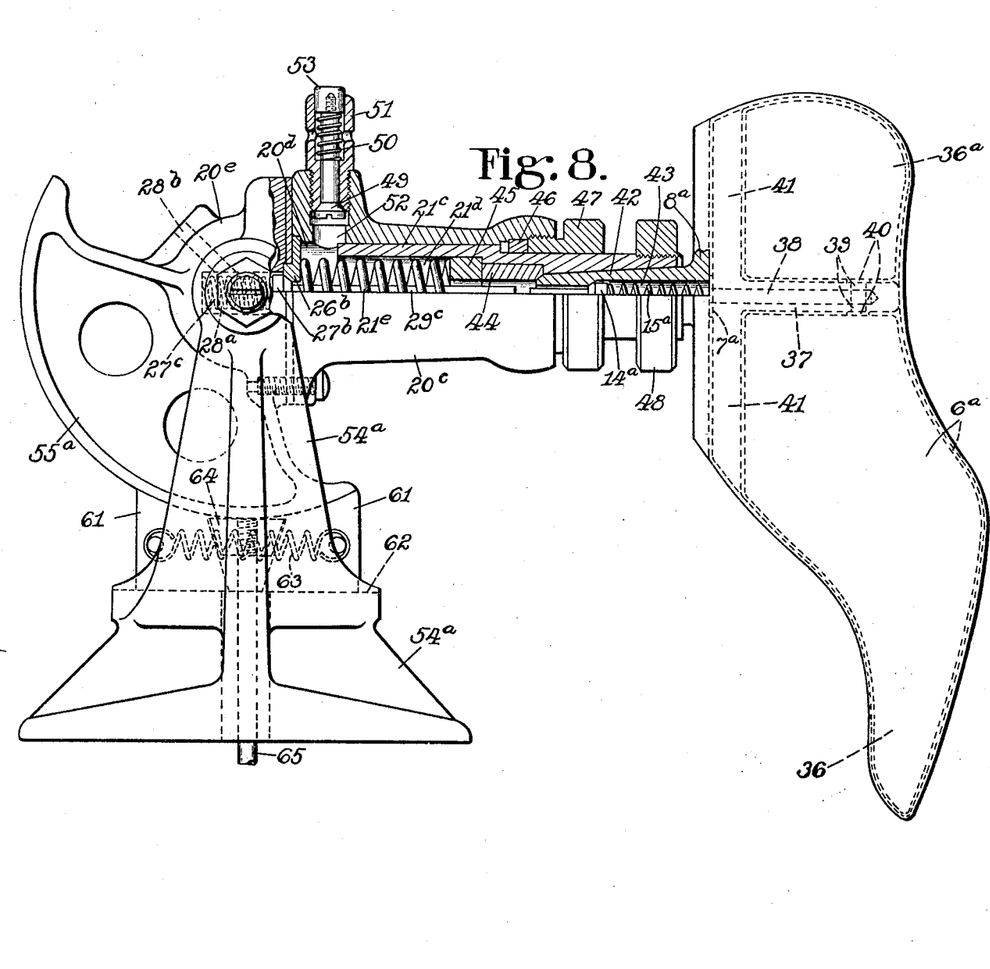
Figure 8 is a part sectional elevation of a tree and support of modified construction.

According to the example illustrated in Figure 8 the tree comprises separate inflatable forepart and heel sections 36 and 36a arranged on opposite sides of a metal T-piece, the stem 37 of which has a longitudinal bore or passage 38 and, at the lower end, transverse ports or holes 39 which register with corresponding holes or apertures 40 in the respective sections. The lateral arms 41 of the T extend over the forepart and heel sections to afford rigid support thereto in this region. The said sections together with the T-piece are enclosed in a casing or covering 6a the casing being provided with a hole 7a to register with the bore in the T-piece. The tree is completed by a metal plate 8a applied to the head of the T-piece, on the outside of the casing, and furnished centrally with a supporting projection in the form of a tapered plug or boss 42 having a bore or longitudinal passage 43 which registers with that in the T-piece and houses a plunger or poppet valve 14a and a compression spring 15a for controlling same. The valve is normally held against its seating by the spring so that the outer end thereof projects from the tapered plug or boss, said valve being pushed inwards for inflating and deflating the tree.

The support for the tree just described comprises a rigid arm 20c having a longitudinal bore 20d housing a slidable sleeve 21c the bore of which is inwardly tapered for a part of its length from one end to provide the socket for the aforesaid tapered plug or boss 42 on the tree. A rubber or like packing 44 is inserted between the inner end of the socket and a metal ring 45 in the sleeve to make an airtight joint with the plug or boss. The sleeve is controlled by a compression spring 21e located between the ring 45 and a plate 26b, constituting a valve seating, at one end of the arm. The sleeve 21c projects from the arm at the end to which the tree is applied through a gland constituted by a rubber or like packing 46 and a nut 47 screwed into the arm, and the outer end of the sleeve is screw-threaded to receive a nut 48 which is provided to facilitate withdrawal of the plug or boss 42 from the tapered socket when it is desired to remove the tree from the support, for which purpose, the nut is rotated into contact with the plate 8a on which the plug or boss is formed. At the other end the arm has a removable cap 20e provided centrally with a longitudinal passage 28a which communicates with, but is smaller than, the aforesaid bore 20d and houses the head of an inlet valve, constituted by a poppet or plunger 27b, and a compression spring 27c, for controlling the passage of air or other fluid through the arm for inflating the tree. The said valve has a long stem 29c which extends into the sleeve 21c co-axially therewith, and the head of the valve is normally pressed against the seating 26b. Access to the passage 28a is provided by an intake passage 28b formed in the cap 20e for connection, as by means of a hose (not shown), with the source from which the air or other fluid is supplied.

When the tree is applied to the support the inner end of the valve in the arm and the outer end of the valve in the tree oppose each other with but a short space in between. As in the previously described arrangement the spring which controls the valve 14a is somewhat weaker than that controlling the valve 27b. The stem 29c of the valve 27b is of a somewhat larger diameter than the bore 43 in the tapered plug or boss. By pushing the tree, the sleeve 21c is moved inwards in the arm thus bringing the opposing ends of the two valves into contact so that the tree valve 14a is pushed off its seating until the stem 29c of the arm valve 27b engages the tapered plug or boss, whereupon continued inward movement of the sleeve pushes the valve 27b off its seating so that air or other fluid passes through the arm and inflates the tree. As in the other example hereinbefore described the movement of the sleeve is effected against the action of the controlling spring 21e so that when the pressure on the sleeve is relieved the spring operates to return same to the normal position and allow the inlet valves to close to stop the inflating action.

In the last described example the initial movement of the sleeve which brings the two inlet valves into contact and opens the valve in the tree, is utilized for deflating the tree while the latter is on the support, and in conjunction with this, an exhaust valve is provided in the arm for actuation by the operator. Conveniently this valve consists of a poppet or plunger 49 controlled by a compression spring 50, and is located in a housing 51 screwed into a passage 52 opening into the bore in the arm, the valve being provided with a button 53 for operation by finger pressure.

The arm 20 or 20c may be removably or otherwise combined with the frame of a treeing machine or appliance or in any other desired frame, stand or like part. Alternatively said arm may be formed and mounted for adjustment in the manner now to be described with reference to the adjustable stand or support which is included in the present invention.

According to this part of the invention there is provided a boot or shoe treeing stand or support comprising an arm or like carrier for the tree, (this may be the arm already described in detail) and a bearing, stand or frame in which the said arm or carrier is mounted by means of pivots arranged at right angles to the carrier, so as to enable it to be adjusted from one position to another, as and for the purpose previously alluded to herein. Means, either positive or frictional, are provided for engagement with a part concentric with the pivots to lock or hold the movable arm or carrier in the desired position, such means being actuated by the operator to release the arm or carrier for adjustment as required. Conveniently said means comprise a segment on the arm and a locking or brake device on or in the bearing, frame or stand, said device being normally held in contact with the segment by spring means, and releasable by hand or foot operable means.

In a practical example the arm is constructed and mounted so as to swivel or pivot on a horizontal axis in a bifurcated stand or frame 54, and has a segment 55, concentric with said axis. The arm and segment are formed in two parts rigidly connected together by screws, and mounted by means of centre screws 56 which are inserted in the upper ends of the stand or frame and enter corresponding counter-sinks in the arm, or by any equivalent means. With an arm 20 or 20c constructed as previously set forth in detail herein the segment may be formed integrally with the cap 20b or 20e and the latter may also have formed therein the countersinks which receive the centre screws 56.

The swivelling or pivotal arm is maintained in the desired position by means of a vertical rod 57, controlled in one direction by a spring 58 and in the other direction by a treadle (not shown), said rod, at its upper end, being formed to enter a series of holes 59 provided in the periphery of the segment. Two pins 60 are furnished at opposite ends of the segment for engagement with a suitable part of the frame to determine the full extent of the swinging movement in each direction.

According to a modification illustrated in Figure 8, the swivelling or pivotal arm is maintained in the desired position by means of slidable brake blocks 61 which act upon the periphery of the segment 55a on opposite sides of the axis thereof. These blocks are mounted in a transverse groove or guide 62 in the lower part of the stand or frame 54a, the upper faces of the blocks being suitably curved or hollowed. The two blocks are connected by a tension spring 63, or springs i. e. one on each side thereof, whereby they are normally maintained in contact with the segment. The blocks are moved in opposite directions against the spring action to free the segment by means of a wedge block 64 located between the inner or opposing ends of the blocks, and connected to or with a treadle or equivalent means (not shown) by a rod or link 65, the inner or opposing ends of the blocks being bevelled or inclined to suit the wedge. If desired, the faces of the brake blocks may be lined, or the periphery of the segment may be faced with frictional material of any kind usually adapted for braking purposes.

Having thus described our invention, what we claim as new and desire to secure by Letters Patent of the United States is:

1. In a machine for use in treeing boots and shoes, a tree, a movably mounted supporting member constructed and arranged detachably to support said tree, said support and said tree being provided with coacting passageways for the admission of air to the tree, a valve for controlling one of said passageways, and means for opening said valve upon movement of the tree and said movable supporting member.

2. In a machine for use in treeing boots and shoes, a support having a movably mounted portion provided with a socket, said support being provided with a passageway terminating in said socket, a spring-pressed valve in said passageway, an inflatable tree having an attaching member adapted to be received in said socket and provided with a passageway which may be brought into operative relation to the passageway in the support, a spring-pressed valve in said latter passageway, and means for operating said valves on movement of said tree and the socket-carrying portion of the support.

3. In or for a treeing machine or appliance for boots and shoes, a tree comprising an inflatable foot to which is attached a plate provided with a central boss and an attached disc, and a bush or sleeve which houses a plunger or poppet valve and a compression spring, said valve being normally held against its seating by the spring so that the outer end of the valve projects from the plate into a hole formed eccentrically in the disc, the valve being pushed inwards against the action of its spring for inflating and deflating the tree, all substantially as and for the purpose described.

4. For a tree as claimed in claim 3, a support comprising an arm having a longitudinal bore housing a spring controlled slidable sleeve, the outer end of which is formed or carries a part formed to receive the said disc on the tree, said arm, at its other end, being provided with a longitudinal passage which houses the head of an inlet valve, the stem of which or a push rod co-axial therewith projects through the sleeve for engagement with the outer end of the valve in the tree, all substantially as and for the purpose herein described.

5. A support comprising an arm, a tree having a valve, said arm having a slidable portion constructed and arranged movably to support said tree in a plurality of positions, said arm being furnished with means for deflating the tree comprising a pin or the like fixed in the arm in a position to be engaged by the outer end of the tree valve upon movement of the tree into position to bring the valve opposite to the pin or the like, and movement of the tree towards the support, all substantially as and for the purpose set forth.

6. In a machine for use in treeing boots and shoes, a support having a socket a portion of which is circular, means for supplying air, said support being provided with a connecting passage extending from said means to said socket, and an inflatable tree having a projecting attaching member constructed and arranged to be rotatably received within said socket, said attaching member having an eccentrically disposed passage constructed and arranged to be brought into alinement with said passage in the support upon rotation of the tree in the socket.

7. In a machine for use in treeing boots and shoes, a support having a socket a portion of which is circular, means for supplying air, said support being provided with a connecting passage extending from said supply means to said socket, and an inflatable tree having a projecting attaching member constructed and arranged to be rotatably received within said socket, said attaching member having an eccentrically disposed passage constructed and arranged to be brought into alinement with said passage in the support upon rotation of the tree in the socket and said tree having a valve whereby it may be removed from the support and maintained in an inflated condition.

8. In a machine for use in treeing boots and shoes, an inflatable tree, a support having a slidable portion constructed and arranged detachably to carry said tree, said tree having a passageway for air, a spring-pressed valve in said passageway, and means for opening said valve and supplying air to said tree upon movement of the tree and the slidable portion of the support.

9. In a machine for use in treeing boots and shoes, a support having a movable portion provided with a socket, a tree having a projecting attaching member constructed and arranged to be received in said socket, said support and said tree being provided with connecting passageways for the admission of air to the tree, a spring-pressed valve in one of said passageways, and means for opening said valve upon movement of the tree and the socket-carrying portion of the support.

10. In a machine for use in treeing boots and shoes, a support having a movably mounted portion provided with a socket, said support being provided with a passageway terminating in said socket, a spring-pressed valve in said passageway, an inflatable tree having an attaching member adapted to be received in said socket and provided with a passageway which may be brought into operative relation to the passageway in the support, a spring-pressed valve in said latter passageway, and means for operating said valves in a predetermined sequence on movement of said tree and the socket-carrying portion of the support.

11. In a machine for use in treeing boots and shoes, a support having a slidably mounted arm provided with a socket, said support and said arm having a passageway terminating in the socket, a spring-controlled valve in said passageway, a coacting stem extending through said passageway to a point adjacent to said socket, an inflatable tree having an attaching member adapted to be received in said socket and provided with a passageway adapted to be alined with the passageway in said arm, and a valve in said latter passageway having a stem exposed at the portion of the attaching member which is received in the socket and adapted to be brought into engagement with the stem in said arm upon sliding movement of the tree and the arm whereby said valves will be opened and air admitted to the tree.

12. In a machine for use in treeing boots and shoes, a support having a slidably mounted member provided with a socket, a pin in said support slidable in said member and projecting into said socket, said slidable member having an outlet passage extending into said socket at a point adjacent to said pin, and an inflatable tree having a projecting attaching member adapted to be movably received in said socket, said attaching member having a passageway controlled by a valve adapted to be brought into alinement with said pin whereby upon pressure against the tree and sliding movement of said slidable member and the tree the valve will be opened by said pin, thereby to deflate the tree.

13. In a machine for use in treeing boots and shoes, a support having a tapered socket and a passageway terminating in said socket, an inflatable tree provided with a tapered plug adapted to fit said socket, a valve in said tapered plug, and means in said support for releasing said valve.

14. In a machine for use in treeing boots and shoes, a support having a slidable portion provided with a tapered socket, said support having a passageway terminating in said socket, an inflatable tree provided with a tapered plug adapted to be received in said socket, said plug having a passageway, a valve in said passageway, and means within said support constructed and arranged to release said valve upon movement of said slidable portion and the tree.

15. In a machine for use in treeing boots and shoes, a support having a slidable portion provided with a tapered socket, said support having a passageway terminating in said socket, an inflatable tree provided with a tapered plug adapted to be received in said socket, said plug having a passageway, a valve in said passageway, and means within said support constructed and arranged to release said valve upon movement of said slidable portion, said support being provided with an operator-controlled exhaust valve.

In testimony whereof we have signed our names to this specification.

ISAAC LEONARD READ.
FRANK COLEMAN CHOICE.